United States Patent

Mayr-Fröhlich et al.

[11] Patent Number: 5,549,364
[45] Date of Patent: Aug. 27, 1996

[54] METHOD AND DEVICE FOR ADJUSTING THE BRAKE FORCE DISTRIBUTION BETWEEN A TOWING VEHICLE AND A TRAILER

[75] Inventors: Mathias Mayr-Fröhlich, München; Alfred Utzt, Fürstenfeldbruck, both of Germany

[73] Assignee: Knorr-Bremse Systeme fur Nutzfahrzeuge GmbH, Germany

[21] Appl. No.: 419,195

[22] Filed: Apr. 10, 1995

[30] Foreign Application Priority Data

Apr. 11, 1994 [DE] Germany ............... 44 12 430.9

[51] Int. Cl.$^6$ .................. B60T 8/00; B60T 8/18; B60T 8/32
[52] U.S. Cl. ............................. 303/9.69; 303/123
[58] Field of Search ............... 303/7, 9.69, 22.1, 303/155, 123, 124, 174, 192, 166

[56] References Cited

U.S. PATENT DOCUMENTS

| 5,002,343 | 3/1991 | Brearley et al. ............... 303/7 |
| 5,281,006 | 1/1994 | Gütz et al. .................. 303/7 |
| 5,333,940 | 8/1994 | Topfer ......................... 303/7 |

FOREIGN PATENT DOCUMENTS

| 4035805 | 3/1992 | Germany ............ B60T 8/00 |
| 4130848 | 3/1993 | Germany ............ B60T 8/60 |
| 4220991 | 1/1994 | Germany ............ B60T 8/00 |

*Primary Examiner*—Josie Ballato
*Attorney, Agent, or Firm*—Senniger, Powers, Leavitt & Roedel

[57] ABSTRACT

In order to adapt the brake force of a towed vehicle or trailer in an optimal fashion, it is necessary to know the coupling forces between the towing vehicle and the trailer or towed vehicle. One prerequisite for determining this coupling force is the knowledge of the total mass of the vehicle. This total mass is determined from an energy balance that contains the variables of the speed, a parameter of the brake energy and one parameter of the driving energy which are provided by systems that already exist in the motor vehicle. For this purpose, three energy balances are established at three different times, with the total mass of the motor vehicle and the slope of the road being determined from the three energy balances. A trailer brake valve subsequently is adjusted depending on the vehicle mass.

9 Claims, 2 Drawing Sheets

5,549,364

METHOD AND DEVICE FOR ADJUSTING THE BRAKE FORCE DISTRIBUTION BETWEEN A TOWING VEHICLE AND A TRAILER

BACKGROUND OF THE INVENTION

The invention pertains to a method for adjusting the brake force distribution between a towing vehicle and a trailer as a function of the weight of the trailer as well as a device for carrying out said method.

It has been known for quite some time that the brake force between a towing vehicle and a trailer needs to be adjusted as a function of the load of the trailer so as to obtain an optimal braking effect and prevent the forces on the trailer coupling from becoming excessively high. In older systems, a valve on the trailer was actuated manually (this also applies to railroad cars) if the load was changed. However, more modern systems have automated this process by measuring the load of the trailer if said trailer is equipped with a pneumatic suspension and actuating a control unit for distributing the brake force as a function of said load measurement. In other systems, the coupling force between the towing vehicle and the trailer was measured on the trailer coupling by means of sensors that are sensitive to tension or pressure, with the brake force distribution being adjusted as a function of these measured values.

However, it was established that most sensors are unable to withstand the rough conditions that exist during the operation of a truck or a railroad, i.e., these sensors frequently fail. The utilization of sensors that are designed as electromechanical transducers is associated with substantial expenditures for the signal transmission which in most instances is accomplished by electric cables. If the signals are transmitted from the trailer to the towing vehicle or vice versa, said transmission requires additional plug connections or plug couplings that must be protected against water, the penetration of dirt, salt, etc., with high expenditures.

SUMMARY OF THE INVENTION

The present invention is based on the objective of improving the initially mentioned method as well as the device for carrying out said method in such a way that reliable parameters can be acquired by means of existing sensors, with said parameters allowing an adjustment of the brake force distribution and consequently an optimization of the coupling forces between the towing vehicle and the trailer.

The principle of the invention is based on establishing an energy balance of the motor vehicle at different times. These energy balances are based on few measurable variables provided by the antilocking system and the drive control in the motor vehicle. The total energy of a driving vehicle is composed of the following components: the driving energy that is delivered to the vehicle by the driving motor; the kinetic energy of the vehicle (including the rotational energy of the wheels); the potential energy while driving through different elevations as well as the "lost energies" due to wind resistance, rolling resistance and possibly the brake energy that was applied or converted into heat. If this energy balance is established for three different times ($t_0$, $t_1$ and $t_2$), these three energies are identical according to the law of conservation of energy. It will be demonstrated in detail below that this results in two equations with two unknowns that can be solved for both unknowns. In this case, the unknowns represent the total mass of the traction connection and the slope of the road over the distance traveled. If one assumes that the slope of the road remains unchanged during the measuring duration, it is possible to determine the mass of the motor vehicle from these unknowns. Once the mass of the towing vehicle (e.g., a semitrailer truck, a locomotive, etc.) is known, it is possible to determine the mass of the trailer or the trailers and adjust the brake force distribution in accordance with this determination.

Consequently, the only "measurable variables" required are the vehicle speed which is already measured by the antilocking or antiskid system, one parameter of the brake energy that is also provided by the antilocking or antiskid system, e.g., in the form of the brake pressure, and one parameter of the driving power which, in electric railroads, is provided in the form of the electric current for the driving motor or, in diesel engines, in the form of a signal for the torque generated by the motor by an electronic diesel control that is provided in modern vehicles. All other specific parameters of the vehicle that are required for establishing the energy balance, e.g., the rolling resistance, the wind resistance, etc., can be assumed to be constant for the respective vehicle or to be dependent only on the aforementioned measurable variables according to a predetermined function.

Consequently, these parameters or functions can be stored and used for establishing the energy balance without having to carry out additional measurements.

At this point we would like to expressly refer to the fact that the present invention is not only suitable for motor trucks with trailers, e.g., semitrailer trucks, but also in vehicles that are bound to rails or tracks, e.g., railroads, subways, etc.

Briefly, therefore, the invention is directed to a method for adjusting the brake force distribution between a towing vehicle and a trailer as a function of the weight of the trailer. The following parameters are measured: the vehicle speed, a variable that is related to the driving energy of the towing vehicle, and a variable that is related to the brake energy. The total energy of the interconnected motor vehicle is determined at three different times from the measured values and stored values that correspond with variables that are specific to the motor vehicle. The interconnected vehicle mass is determined from the determined energy values, and the brake force distribution between the towing vehicle and the trailer is adjusted as a function of the determined vehicle mass.

The invention is also directed to a device for adjusting the brake force distribution between a towing vehicle and a trailer as a function of the weight of the trailer. The device has a sensor for measuring the rotational speed of a wheel or the motor vehicle speed, a sensor for measuring a variable that is related to the driving energy of the driving motor of the towing vehicle, and a sensor for measuring a variable that is related to the brake energy. The device also has a computer that is connected with the sensors as well as additional memories that generate from the measured and stored values a signal that corresponds to the mass of the trailer, the signal being fed to a regulator that adjusts a brake parameter of the trailer brake valve.

Advantageous embodiments and developments of the invention are disclosed in the subclaims.

BRIEF DESCRIPTION OF THE DRAWINGS

The invention is described in detail below with reference to one embodiment that is illustrated in the figures. The figures show.

DETAILED DESCRIPTION OF THE INVENTION

Figure 1:
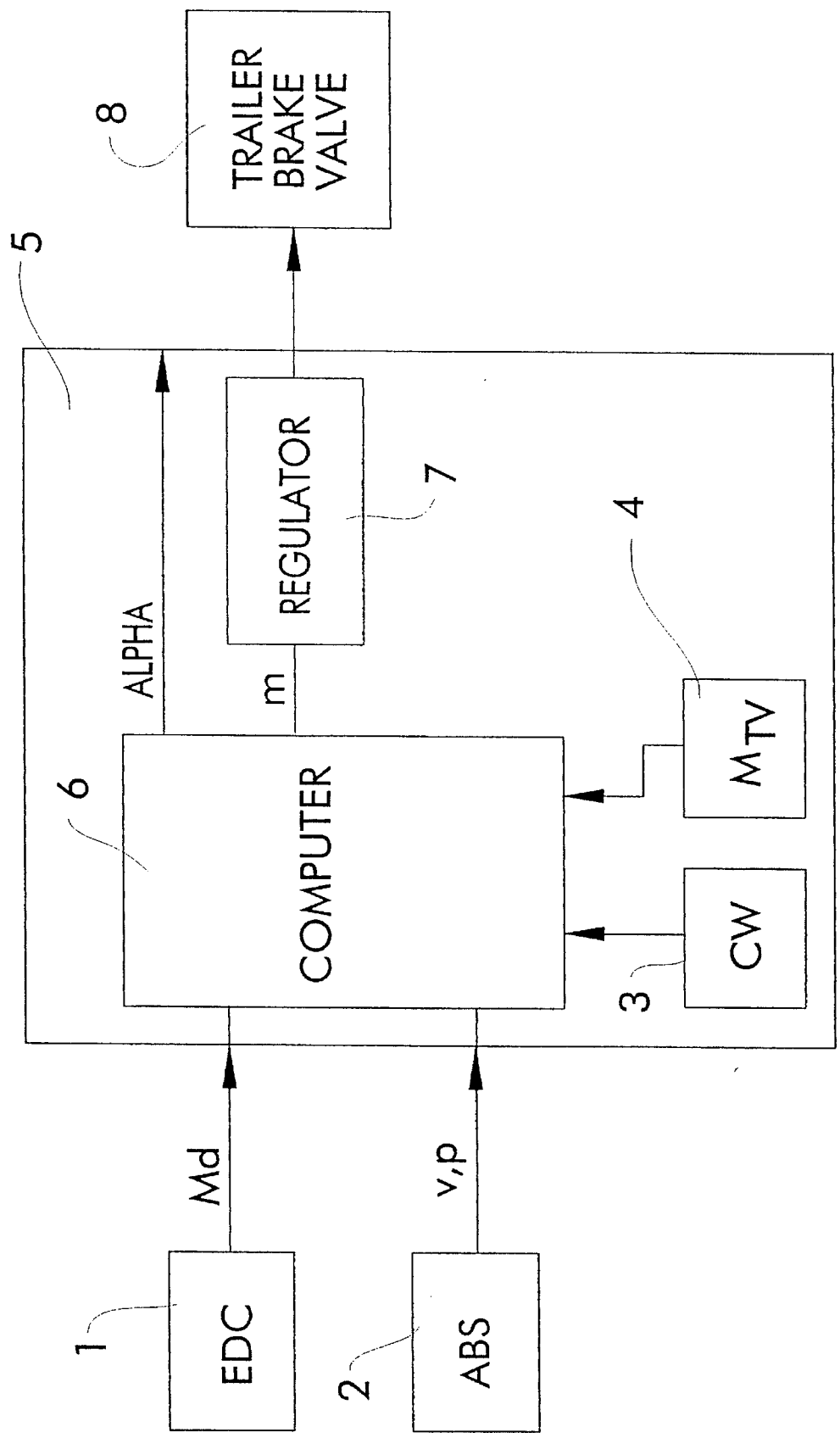
FIG. 1: a basic circuit diagram of a device according to the invention.

Initially, the description refers to FIG. 1. A first unit, in this case an electronic diesel control 1 (EDC for electronic diesel control), provides a parameter Md that has a fixed relation to the driving energy that is introduced into the traction connection by the driving motor. The EDC 1, for example, provides an electric signal that is proportional to the current torque Md of the motor.

An antilocking or antiskid system 2 (ABS) that is also present in the motor vehicle provides a signal v that corresponds to the speed of the motor vehicle and usually is determined from the rotational speed of the wheels. In addition, the antilocking or antiskid system 2 provides a signal that has a defined relation to the brake energy applied, in this case a signal p that corresponds to the brake pressure. It is not imperative that this signal be acquired via a pressure sensor. It is also possible to determine a signal that corresponds to the brake pressure by measuring the opening times, the closing times and the ventilation times of the brake valves and determining a signal that corresponds to the brake pressure thereof in customary fashion. Since this process in a broader sense also pertains to a measurement, namely a time measurement as well as any arbitrary detection of the condition of the valves, the term "measurable variables" is used in the following text in accordance with this generalized meaning. In this sense, three measurable variables exist in the present instance, namely the motor torque Md, the motor vehicle speed v and the brake pressure p. In addition, the correction value cw for the air or wind resistance of the respective vehicle which is indicated by the block 3 as well as the mass $m_{fv}$ of the towing vehicle (e.g., a semitrailer truck, a locomotive, etc.) which is indicated by the block 4 are also known (changes of the mass due to filling the tank and the weight of passengers in the motor vehicles can be ignored). The three measurable variables from the EDC 1, the ABS 2 and the blocks 3 and 4 are fed to a computer 6 in a control unit 5 which generates a signal m that corresponds to the mass of the trailer or the trailers from these input values. This signal is fed to a regulator 7 which generates a correcting value that is fed to the brake valve 8 of the trailer or the trailers and adjusts a parameter of the brake force distribution at this location. In addition, the computer 6 also may generate an additional signal a that corresponds to the slope of the road over which the vehicle is currently traveling. In the present embodiment, this signal is not used for adjusting the brake parameters. However, it would be easily possible to utilize this signal for adjusting the brake parameters or other functions, e.g., controlling the transmission or the like.

Figure 2:
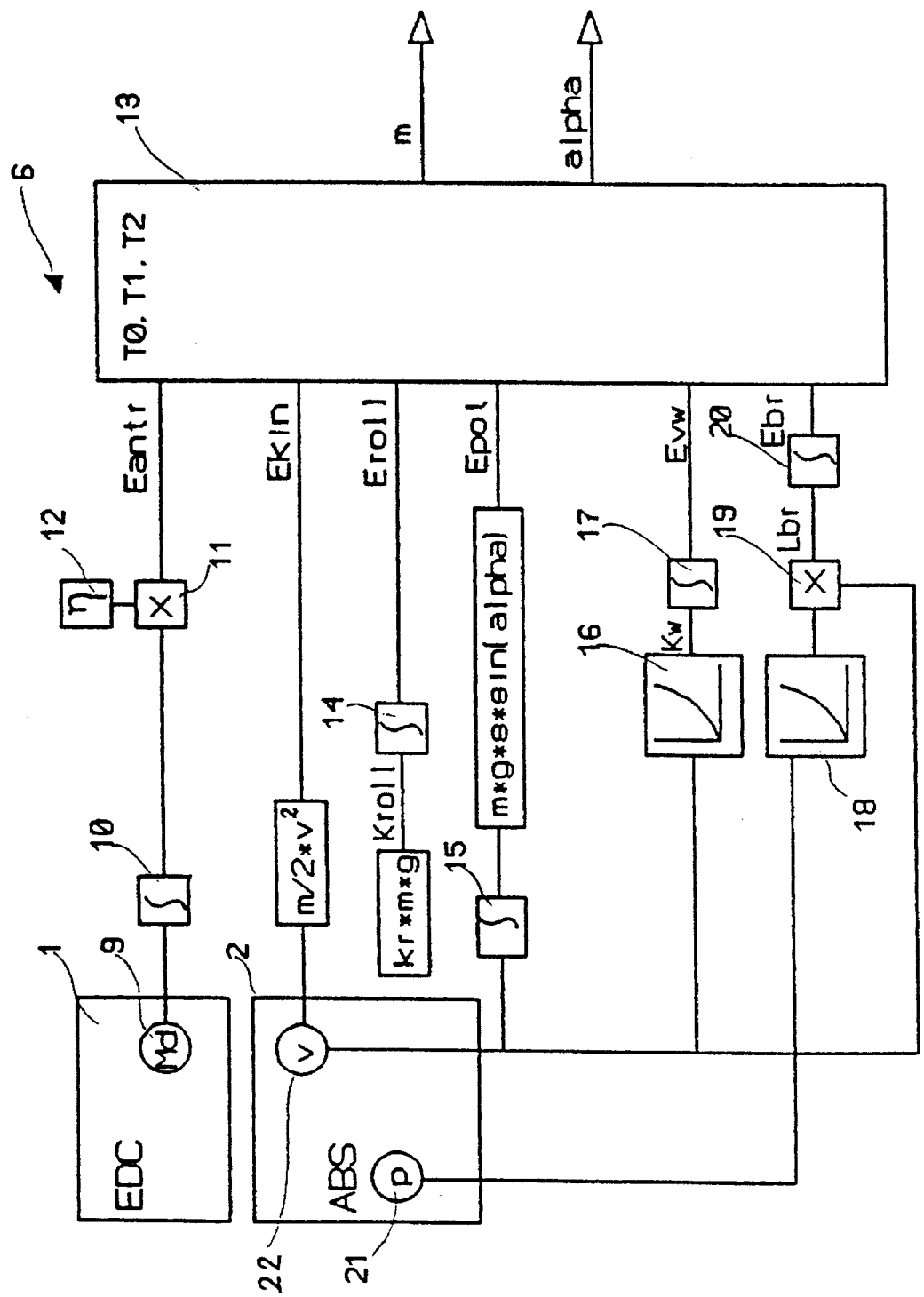
FIG. 2: a more detailed basic circuit diagram of the device according to the invention.

FIG. 2 shows the basic principle of the computer 6 shown in FIG. 1 in a more detailed fashion. In this case, the EDC 1 provides a signal Md that corresponds to the torque of the driving motor and is acquired by a sensor 9. A variable $E_{Antr}$ that corresponds to the driving energy transmitted to the motor vehicle is obtained after an integration in time in an integrator 10 and multiplication (multiplier 11) with a constant factor that is stored in a memory 12 and, for example, corresponds to the operating ratio of the driving motor. However, the value of this driving energy can also be negative if the motor operates as a motor brake while decelerating the vehicle. This signal that corresponds to the energy of the driving motor is fed to a computer 13.

The kinetic energy of the motor vehicle is determined in accordance with the known energy equation $E_{kin} = (m/2)*v^2$, with m representing the total mass of the train and v representing the speed. A "measured value" for the speed v is obtained from the ABS 2. The mass m is, in a mathematical sense, still an unknown.

The next energy to be taken in consideration is the energy of the rolling resistance. The rolling force $K_{roll}$ is proportional to the product of the mass and the acceleration due to gravity (m*g) and a constant factor $k_r$ that is specific to the motor vehicle.

The rolling energy $E_{roll}$ is obtained after integration in time in an integrator 14.

The potential energy of the motor vehicle $E_{pot}$ is determined in accordance with the equation $$E_{pot} = m*g*s*sin(\text{alpha}),$$

with m representing the total mass of the train, g representing the acceleration due to gravity, s representing the distance traveled and alpha representing the slope of the road. As can be seen in FIG. 2 this slope alpha is calculated in integrator 15, used to calculate potential energy, and eventually output from computer 6.

In this case, the distance s traveled is the chronological integral of the speed.

The energy lost due to the wind resistance depends on the correction value $c_w$ for the air resistance and the speed v of the motor vehicle. The functional correlation between the speed of the motor vehicle and the wind force can be stored in a "table" 16, the input quantity of which is the speed v. The energy lost due to the wind resistance $E_{vw}$ is obtained after integration in time in an integrator 17. Finally, one obtains the brake energy $E_{br}$, as a function of the brake pressure p that is provided by a sensor 21 in the ABS 2 as well as the speed v (in particular, $v_O$, at time $t_O$, and $v_1$ at time $t_1$) which is also provided by a sensor 22 in the ABS 2. The functional correlation between the brake pressure and the brake force is also stored in a table 18. The braking power $L_{br}$ is obtained by multiplying the brake force with the speed v in a multiplier 19. The brake energy $E_{br}$, is obtained by integrating said braking power $L_{br}$ in an integrator 20.

All aforementioned energy values collectively form the total energy of the interconnected vehicle at the respective time. In this case, the vehicle mass m and the slope of the road α represent unknown variables. Consequently, the following energy balance may be established at the time $t_O$:

$$E_O = E_{antr}(0) + E_{kin}(0) + E_{pot}(0) - E_{roll}(0) - E_{vw}(0) - E_{br}(0).$$

Corresponding energy equations for the energies $E_1$ and $E_2$ may be established at the other times $t_1$ and $t_2$ in the same fashion. According to the law of conservation of energy, the energies are $E_O = E_1 = E_2$. If one sets the portion representing the potential energy $E_{pot}(0)$, the energy portion representing the wind resistance $E_{vw}(0)$ and the energy portion representing the frictional losses $E_{roll}(0)$ to zero for the time $t_O$ in accordance with the previous definition, the two following equations can be established: $E_O = E_1$ and $E_O = E_2$. Consequently, one obtains two equations with two unknown variables (m and α) under the prerequisite that the slope of the road a is constant at the times $t_O$, $t_1$ and $t_2$. The first of these equations is as follows:

$$[(v_O^2-v_1^2)*m/2+(s_O-s_1)*m*g*sin\alpha-E_{rollO}+E_{roll0}-E_{vwO}+E_{vw1}-E_{br0}+E_{br1}]$$

which is arrived at by setting the $E_O = E_1$ where, $$[E_O=E_{antr0}+(m/2)*v_O^2+*m*g*sin\alpha-E_{rollO}-E_{vwO}-E_{br0}]$$

and $$[E_1=E_{antr1}+(m/2)*v_1^2+s_1*m*g*sin\alpha-E_{roll1}-E_{vw1}-E_{br1}]$$

The second equation is similarly obtained by setting $E_O = E_2$. The unknown variables m and α can be determined from these two equations, and the brake force distribution can be adjusted as a function of m.

In theory, it would suffice to carry out the aforementioned measurements only at the three times $t_0$, $t_1$ and $t_2$ because one can assume that the vehicle mass does not change while traveling. However, it is practical to carry out these calculations several times at the beginning of the ride in order to compensate for the influence of measuring errors, e.g., by means of forming an average value. If several measurements are carried out, these average values will only fluctuate slightly, so that the respective parameter for the trailer brake valve is adjusted in such a way that an optimal brake force distribution between the towing vehicle and a towed vehicle is attained.

In the preferred embodiment, the brake force distribution is adjusted by adjustment of a control valve which regulates the interconnected motor vehicle's brake force proportion applied to the towing vehicle and the interconnected motor vehicle's brake force proportion applied to the trailer. More particularly, the interconnected motor vehicle's mass comprises a towing vehicle mass component and a trailer mass component. The interconnected motor vehicle's mass component is determined in accordance with the invention while the towing vehicle's mass component is a known quantity. The trailer mass component is the difference between the two. The brake force distribution adjustment involves increasing the proportion of the interconnected motor vehicle's brake force applied to the trailer and decreasing the proportion of the interconnected motor vehicle's brake force applied to the towing vehicle as the proportion of the interconnected motor vehicle's mass constituted by the trailer mass component increases. On the other hand, the brake force distribution adjustment involves decreasing the proportion of the interconnected motor vehicle's brake force applied to the trailer and increasing the proportion of the interconnected motor vehicle's brake force applied to the towing vehicle as the proportion of the interconnected motor vehicle mass constituted by the trailer mass component decreases. By allocation of the brake force in this manner, pressure on the coupling between the towing vehicle and trailer are reduced.

Once this brake force distribution parameter is adjusted, it is no longer changed while traveling. In other words, the method according to the present invention is not used for continuously regulating the brake force distribution, but rather for the initial adjustment and possibly a subsequent correction of the parameters of the trailer brake valve.

The invention advantageously employs only measurement of parameters on interconnected motor vehicles, as described above such as speed, brake energy, and driving energy, for which sensors are typically in place for measuring. The invention's benefits are achieved without the employment of an additional sensor, as may be associated with the coupling between the towing vehicle and trailer, for measuring forces between the towing vehicle and the trailer. The use of such additional sensors, which are expensive and increase complexity, is thereby advantageously avoided.

The invention naturally may also cooperate with other control circuits of higher ranking, e.g., an antilocking or antiskid system or a coupling force control that also detects the buckling angle between the towing vehicle and the trailer while driving through curves or the risk of jack-knifing while braking the towing vehicle excessively.

What is claimed is:

1. A device for adjusting the brake force distribution between a towing vehicle and a trailer of an interconnected motor vehicle as a function of the interconnected motor vehicle's mass, the device comprising:

a first sensor for measuring a variable selected from a wheel's rotational speed and motor vehicle speed, a second sensor for measuring a variable that is based on the driving energy of the driving motor of the towing vehicle, a third sensor for measuring a variable that is based on the brake energy, and a computer that is connected with the sensors as well as with additional memories, the computer generating from said variables and values stored in said memories a signal that corresponds to the mass of the interconnected motor vehicle, with said signal being fed to a regulator that adjusts a brake parameter of the interconnected motor vehicle's brake valve.

2. A method for adjusting brake force distribution between a towing vehicle and a trailer of an interconnected motor vehicle on a road as a function of the interconnected motor vehicle's mass, the method comprising:

measuring an interconnected motor vehicle speed value with a speed sensor, measuring a value that is based on the towing vehicle's driving energy, measuring a value that is based on the interconnected motor vehicle's brake energy, determining total energy values of the interconnected motor vehicle at three different times from said measured values and stored values that correspond with variables that are specific to the interconnected motor vehicle, determining the slope of the road and the interconnected motor vehicle's mass from said determined energy values, and adjusting the brake force distribution between the towing vehicle and the trailer as a function of the thusly determined interconnected motor vehicle's mass.

3. The method according to claim 2 wherein the brake force distribution is adjusted by adjustment of a control valve which regulates the interconnected motor vehicle's brake force proportion applied to the towing vehicle and the interconnected motor vehicle's brake force proportion applied to the trailer.

4. The method according to claim 3 wherein the interconnected motor vehicle's mass comprises a towing vehicle mass component and a trailer mass component and the brake force distribution is adjusted by:

increasing the interconnected motor vehicle's brake force proportion applied to the trailer and decreasing the interconnected motor vehicle's brake force proportion applied to the towing vehicle as the proportion of the interconnected motor vehicle's mass constituted by the trailer mass component increases, or decreasing the interconnected motor vehicle's brake force proportion applied to the trailer and increasing the interconnected motor vehicle's brake force proportion applied to the towing vehicle as the proportion of the interconnected motor vehicle mass constituted by the trailer mass component decreases.

5. The method according to claim 2 wherein the total energy of the interconnected motor vehicle is determined in accordance with the following relation:

$$E = E_{antr} + E_{kin} + E_{pot} - E_{roll} - E_{vw} - E_{br}$$

with E representing the total energy of the interconnected motor vehicle, $E_{antr}$ representing the driving energy as a function of the variable based on the driving energy, $E_{kin}$ representing the kinetic energy of the interconnected vehicle based on its mass and the speed, $E_{pot}$ representing the potential energy as a function of the mass, the distance traveled and the slope of the road according to the relation m*g*s*sin (slope angle), $E_{roll}$ representing the lost rolling energy as a function of the mass, the acceleration due to gravity and a constant, $E_{vw}$ representing the losses due to wind resistance as a function of the correction value of the wind resistance and the speed, and $E_{br}$ representing the lost brake energy as a function of the vehicle speed and the variable based on the brake energy.

6. The method according to claim 5 wherein the total energy at the first of the three aforementioned measuring times is set identical to the kinetic energy of the interconnected motor vehicle, while all remaining partial energies are set to zero.

7. The method according to claim 6 wherein said three measuring times lie within equidistant time intervals, the slope of the road is assumed to be constant at all three measuring times, and the energy at the first measuring time is set identical to the energy at the second measuring time and identical to the energy at the third measuring time, with the vehicle mass and the slope of the road being determined thereof.

8. The method according to claim 7 wherein the kinetic energy ($E_{kin}$) is composed of the translational motive energy and the rotational energy of the wheels of the motor vehicle as a function of the vehicle speed and the moment of inertia of the wheels.

9. A method for adjusting brake force distribution between a towing vehicle having a driving energy and a trailer of an interconnected motor vehicle on a road as a function of the interconnected motor vehicle's mass, the method comprising:

measuring the interconnected motor vehicle's speed parameter with a speed sensor, storing in a memory parameters specific to the interconnected vehicle, measuring a driving energy parameter that is based on the towing vehicle's driving energy, measuring a brake energy parameter that is based on the interconnected motor vehicle's brake energy, determining total energy values of the interconnected motor vehicle at three different times as a function of the speed parameter, driving energy parameter, brake energy parameter, and said parameters stored in said memory, determining the slope of the road and the interconnected motor vehicle's mass from said determined energy values, and adjusting the brake force distribution between the towing vehicle and the trailer as a function of the thusly determined interconnected motor vehicle's mass by:

increasing the interconnected motor vehicle's brake force proportion applied to the trailer and decreasing the interconnected motor vehicle's brake force proportion applied to the towing vehicle as the proportion of the interconnected motor vehicle's mass constituted by the trailer mass component increases, or decreasing the interconnected motor vehicle's brake force proportion applied to the trailer and increasing the interconnected motor vehicle's brake force proportion applied to the towing vehicle as the proportion of the interconnected motor vehicle mass constituted by the trailer mass component decreases.

* * * * *